(12) United States Patent
Yu et al.

(10) Patent No.: US 11,125,213 B1
(45) Date of Patent: Sep. 21, 2021

(54) ROAD TRAFFIC AND WIND ENERGY COGENERATION SYSTEM

(71) Applicants: Chuang Yu, Wenzhou (CN); Zexiang Wu, Wenzhou (CN); Wenhao Gu, Wenzhou (CN); Bo Li, Wenzhou (CN); Yan Shen, Wenzhou (CN); Jinjing Ly, Wenzhou (CN)

(72) Inventors: Chuang Yu, Wenzhou (CN); Zexiang Wu, Wenzhou (CN); Wenhao Gu, Wenzhou (CN); Bo Li, Wenzhou (CN); Yan Shen, Wenzhou (CN); Jinjing Ly, Wenzhou (CN)

(73) Assignee: Wenhou University, Wenzhou (CN)

( * ) Notice: Subject to any disclaimer, the term of this patent is extended or adjusted under 35 U.S.C. 154(b) by 0 days.

(21) Appl. No.: 16/941,457

(22) Filed: Jul. 28, 2020

(51) Int. Cl.
| | | |
|---|---|---|
| *F03D 9/00* | (2016.01) | |
| *F03D 9/46* | (2016.01) | |
| *A01G 25/00* | (2006.01) | |
| *H02K 7/18* | (2006.01) | |
| *F03B 17/00* | (2006.01) | |

(52) U.S. Cl.
CPC .............. *F03D 9/008* (2013.01); *F03D 9/46* (2016.05); *A01G 25/00* (2013.01); *F03B 17/005* (2013.01); *F05B 2240/9113* (2013.01); *H02K 7/1853* (2013.01)

(58) Field of Classification Search
CPC ... F03D 9/008; F03D 9/11; F03D 9/46; F03B 13/06; F05B 2240/9113
See application file for complete search history.

(56) References Cited

U.S. PATENT DOCUMENTS

| | | | | |
|---|---|---|---|---|
| 4,130,064 A | * | 12/1978 | Bridwell ................. | F04B 17/00 104/154 |
| 4,211,078 A | * | 7/1980 | Bass ......................... | F03G 7/08 185/27 |
| 7,629,698 B2 | * | 12/2009 | Horianopoulos ......... | F03G 7/08 290/1 R |
| 2013/0140830 A1 | * | 6/2013 | Hinks ................... | F03B 17/005 290/1 R |

\* cited by examiner

*Primary Examiner* — Julio C. Gonzalez

(57) ABSTRACT

A road traffic and wind energy cogeneration system, comprising an energy conversion device and a road bearing mechanism, wherein the road bearing mechanism has a container, the container includes a case and a top cover; a piston is disposed in the case; an elastic chamber is disposed between the piston and a bottom wall of the case; the elastic chamber is filled with liquid; a guide column is fixed to the piston; the guide column penetrates upwards through the top cover to be fixed to a road pressure plate; an elastic mechanism is disposed between the piston and case bottom; an air cavity is formed between the top cover and piston; tire air cavity is connected to the wind power installation through the conduit; the elastic chamber is connected to a water flow power installation through the conduit.

9 Claims, 6 Drawing Sheets

ROAD TRAFFIC AND WIND ENERGY COGENERATION SYSTEM

BACKGROUND OF INVENTION

1. Field of the Invention

The present invention relates generally to a road traffic and wind energy cogeneration system.

2. Description of Related Art

Taiwan has a large population and a huge traffic How, if die energy generated by passing vehicles can be converted into electric energy, a huge amount of energy will be obtained. At present, die piezoelectric power generation technology is an important method for converting the energy generated by road traffic. Under the vehicle traffic load effect, the piezoelectric conversion device converts the mechanical energy of vehicles into electric energy. However, the existing piezoelectric conversion devices have low energy conversion rate and bad durability.

SUMMARY OF THE INVENTION

The object of the present invention is to provide a road traffic and wind energy cogeneration system. The cogeneration system can transfer the kinetic energy generated by passing vehicles through liquid and wind respectively to collect more energy.

The present invention provides a road traffic and wind energy cogeneration system, comprising an energy conversion device and a road hearing mechanism, wherein the road bearing mechanism has a container, the container includes a case and a top cover; a piston is disposed in the case; an elastic chamber is disposed between die piston and a bottom wall of the case; the elastic chamber is filled with liquid; a guide column is fixed to the piston; the guide column penetrates upwards through the top cover to be fixed to a road pressure plate; an elastic mechanism is disposed between the piston and case bottom; an air cavity is formed between the top cover and piston; the air cavity is connected to the wind power installation through the conduit; the elastic chamber is connected to a water flow power installation through the conduit.

More particularly, wherein the water flow power installation includes a casing, a sealing gland and a shielding can; multiple storage batteries connected by conductors are disposed in the upper part of the casing, and a generator connected to the storage batteries by conductors is disposed in the lower part; the sealing gland is removably connected to the casing, and the space between the sealing gland and casing forms a liquid circulation chamber; the shaft of the generator extends into the liquid circulation chamber; a shielding can and an impeller connected to the shaft are disposed in the liquid circulation chamber; the shielding can covers the impeller, and a left water circulation channel and a right water circulation channel are disposed in the lower ends on both sides of shielding can; the elastic chamber is connected to the left water circulation channel by a conduit; a first one-way valve conducted to the shielding can unidirectionally is disposed at the joint of the shielding can and conduit: a second one-way valve conducted to the conduit unidirectionally is disposed at the joint of the left water circulation channel and conduit.

More particularly, wherein there is a water tank installed on height, the water tank is connected to the lower green plant irrigation system by the main delivery pipe; the water tank is connected to the lower water source by a delivery pipe; the end of delivery pipe is connected to a water pump; the water pump is powered by a storage battery; the generator is connected to the storage battery where the electric energy is delivered to and stored. More particularly, wherein a conduit power installation is disposed on the main delivery pipe; the conduit power installation has a casing, both ends of the casing are connected to the body of the main delivery pipe; a turbofan is disposed in the casing, the main shall of turbo fan is connected to a worm wheel; the worm wheel engages with a transversely distributed worm; tire worm is located on the transverse shaft; the worm wheel drives the transverse shaft to rotate; a brush connected to the closed circuit is disposed on the transverse shaft; the brush is in tire magnet, cutting magnetic lines during rotation to generate electricity; the conduit power installation is connected to the power grid.

More particularly, wherein the wind power installation has a casing, the casing has an air inlet connected to the conduit; a wind wheel is disposed in the casing; the wind wheel has paddies; the wind wheel is rotatable fitted over the main shaft; the main shaft is connected to the bearing insert; the bearing is fixed to the casing by a support; the generator is installed on the side of casing; the driving shaft of generator penetrates through the casing to form gear worm mechanism coordination with the main shaft.

More particularly, wherein the elastic mechanism comprises at least four elastic pieces between the piston and the bottom wall of casing; an elastic piece comprises a high strength spring, a spring rod and a spring sleeve; the spring sleeve is fixed to the bottom wall of casing; there is a downward guide hole in the spring sleeve; the spring rod is fixed to the piston; the high strength spring is fitted over the spring rod and in the spring sleeve; the spring rod is inserted downwards into the guide hole.

More particularly, wherein the elastic mechanism comprises at least four elastic pieces between the piston and the bottom wall of case; an elastic piece comprises a high strength spring, a spring rod and a spring sleeve; the spring sleeve is fixed to the bottom wall of case; there is a downward guide hole in the spring sleeve; the spring rod is fixed to the piston; the high strength spring Is fitted over the spring rod and in the spring sleeve; the spring rod is inserted downwards into the guide hole.

More particularly, wherein the upper surface of elastic chamber is fixed to die piston, and the lower surface is fixed to the bottom wall of the case, the elastic chamber is opened under the effect of elastic-restoring force of piston.

More particularly, wherein the upper surface of elastic chamber is fixed to the piston, and the lower surface is fixed to the bottom wall of die case, the elastic chamber is opened under the effect of elastic-restoring force of piston.

More particularly, wherein the upper surface of elastic chamber is fixed to the piston, and the lower surface is fixed to the bottom wall of the case, the elastic chamber is opened under the effect of elastic-restoring force of piston.

Effects of the Present Invention:
1) In the present invention, a passing vehicle presses the road pressure plate, the road pressure plate transfers the pressure to the piston through the guide column, forcing the piston to press the elastic chamber downwards, as the elastic chamber is pressed, the liquid flows to the water flow power installation to generate electricity. On the contrary, alter the vehicle leaves, the piston is restored rapidly under the combined action of elastic mechanism and elastic chamber, the gas in the chamber between the piston and top cover is extruded during restoration, so that the air is discharged to the wind power installation quickly to generate electricity. When the piston goes down again, the air enters again for next power generation. The aforeth structure can perform power generation twice in one vehicle rolling, the electricity generation can be increased.

2) The water flows under the shielding can and through the right water circulation channel, liquid circulation chamber and left water circulation channel, and enters the conduit again, at this point, partial water flow enters the space under the shielding can again under the guidance of the first one-way valve and the second one-way valve, and drives the impeller to relate to generate electricity.

3) The water tank on height and tower green plant irrigation system are connected by the main delivery pipe, the electric energy generated by generator can drive the water pump, the water pump delivers the water to the water tank. As the water tank is higher than the plants, the water can reach the plants under the effect of pressure difference.

DETAILED DESCRIPTION OF THE INVENTION

Figure 1:
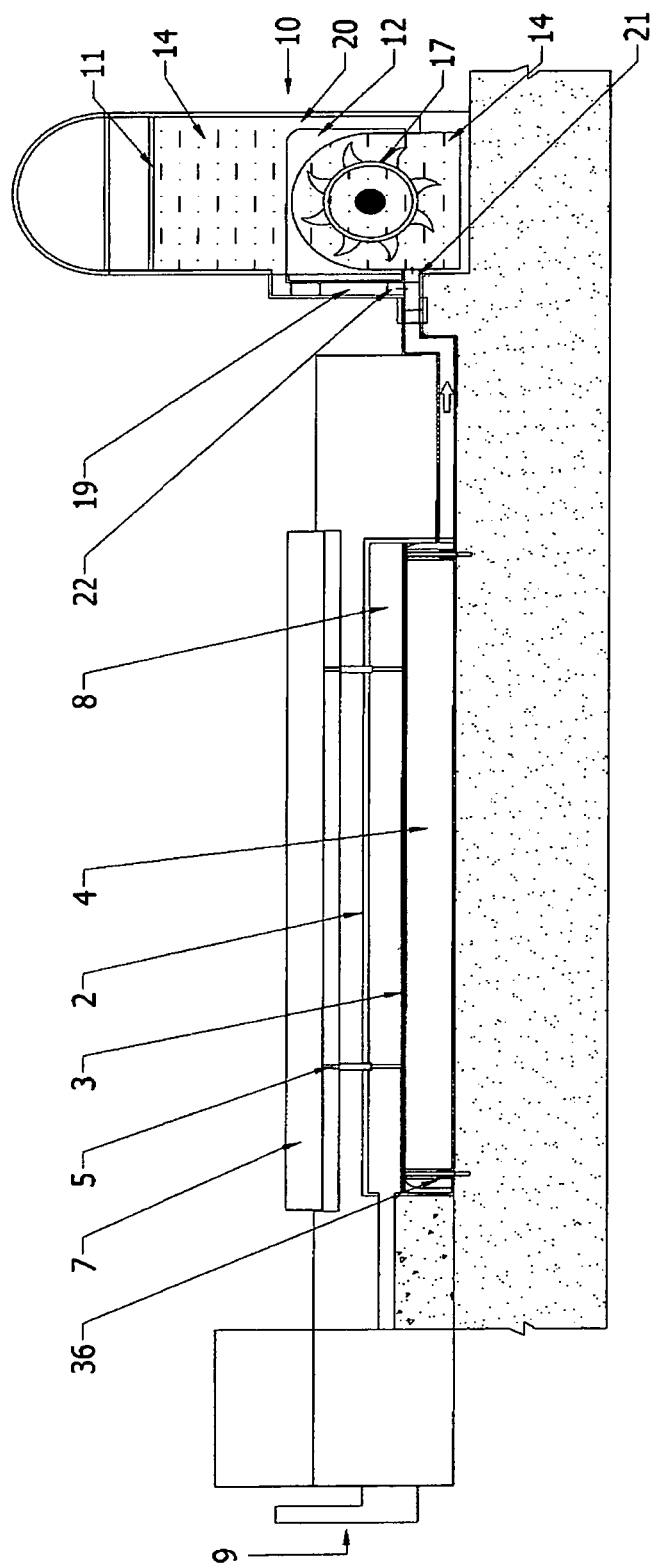
FIG. 1 is a section view of the structure of road traffic and wind energy cogeneration system in Embodiment 1 of the present invention.
Figure 2:
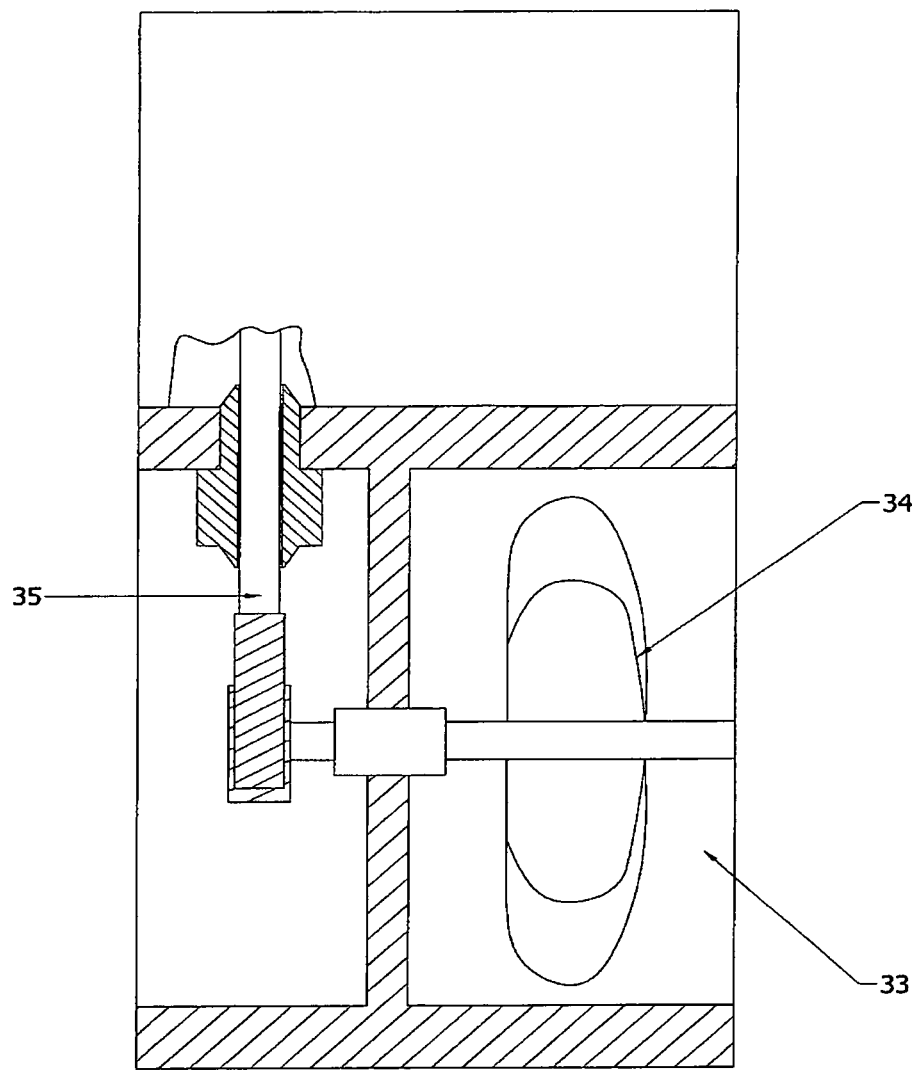
FIG. 2 is a structural representation of wind power installation.
Figure 3:
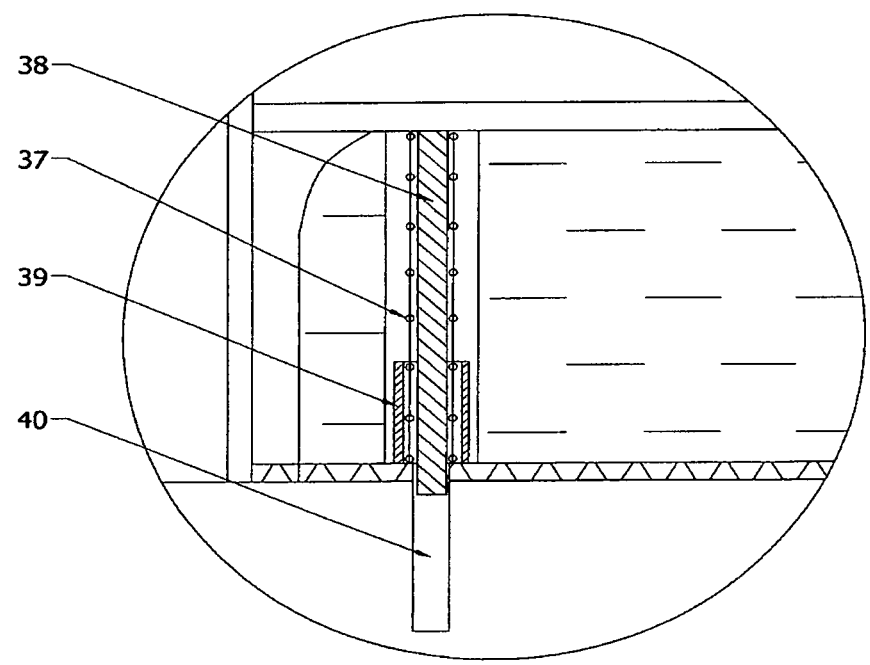
FIG. 3 is a close-up view of the elastic mechanism in Part A of FIG. 1.

FIGS. 1-3 show the road traffic and wind energy cogeneration system in the Embodiment 1 of the present invention, comprising an energy conversion device and a road bearing mechanism. The road bearing mechanism has a container, the container comprises a case and a top cover 2. A piston 3 is disposed in the case. The piston 3 movably fits the case sidewall liquid seal. An elastic chamber 4 is disposed between the piston 3 and bottom wall of case. The elastic chamber 4 is formed of elastic flaps. The elastic flaps are rubber or like materials. The elastic chamber 4 is filled with liquid. A guide column 5 is fixed to the piston 3. The guide column 5 penetrates upwards through the top cover 2 to be fixed to the road pressure plate 7. Art elastic mechanism is disposed between piston 3 and case bottom. An air cavity 8 is formed between the top cover 2 and piston 3. The air cavity 8 is connected to the wind power installation 9 through the conduit. The elastic chamber 4 is connected to the water flow power installation 10 through the conduit. In the present invention, a passing vehicle presses the road pressure plate, the road pressure plate transfers the pressure to the piston through the guide column, so that the piston presses the elastic chamber downwards, when the elastic chamber is pressed, the liquid flows to the water flow power installation to generate electricity. On the contrary, when the vehicle leaves, the piston is restored quickly under the combined action of elastic mechanism and elastic chamber, the gas in the chamber between piston and top cover is extruded during restoration, so that the air is discharged to the wind power installation rapidly to generate electricity. When the piston moves down again, the air enters again for next power generation. The aforethe structure can perform power generation twice in one vehicle rolling, the electricity generation is increased.

As shown in FIG. 1, the water flow power installation 10 comprises a casing, a sealing gland 11 and a shielding can 12. Multiple storage batteries connected by conductors are disposed in the upper part of the casing, a generator 13 connected to the storage batteries by conductors is disposed in the lower part. The sealing gland 11 is removably connected to the casing, and the space between sealing gland 11 and casing forms a liquid circulation chamber 14. The shaft of the generator 15 extends into the liquid circulation chamber 14. A shielding can 12 and an impeller 17 connected to the shaft are disposed in the liquid circulation chamber 14, The shielding can 12 covers the impeller 17, and a left water circulation channel 19 and a right water circulation channel 20 are disposed in the lower ends on both sides of shielding can 12. The elastic chamber 4 is connected to the left water circulation channel 19 by conduit. A first one-way valve 21 conducted to the shielding can unidirectionally is disposed at the joint of the shielding can 12 and conduit. A second one-way valve 22 conducted to the conduit unidirectionaliy is disposed at the joint of the left water circulation channel 19 and conduit. The water flows under the shielding can and through the right water circulation channel, liquid circulation chamber and left water circulation channel to enter She conduit again, at this point, a part of water flow enters the space under the shielding can again under the guidance of the first one-way valve and the second one-way valve, and drives the impeller to rotate to generate electricity. Therefore, the water flow power installation 10 can generate electricity many times in one compression, but the electric energy generated each time decreases gradually.

Figure 4:
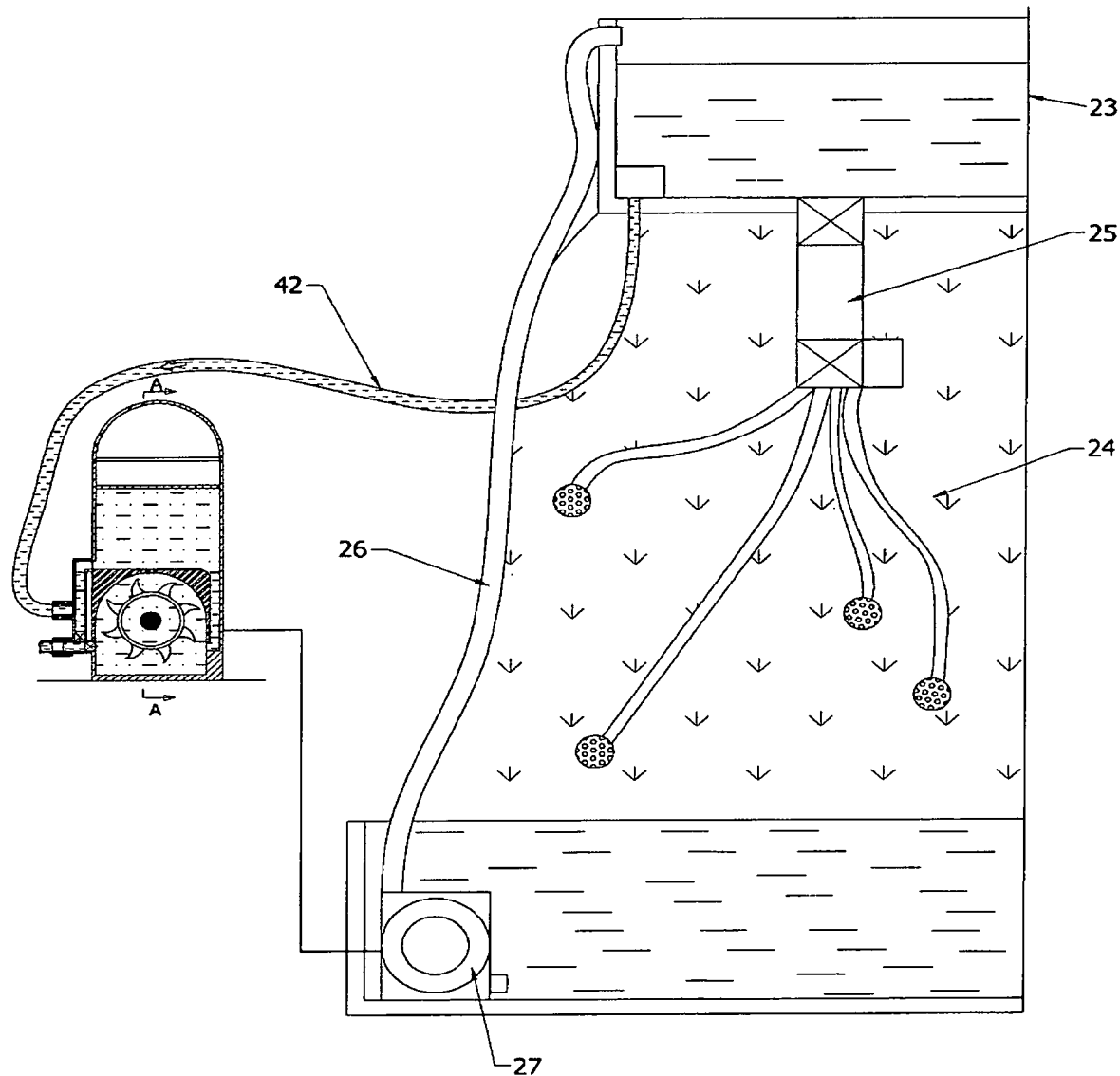
FIG. 4 is a schematic diagram of combined state of wind energy cogeneration system, water tank and green plant irrigation system in Embodiment 2 of the present invention.
Figure 5:
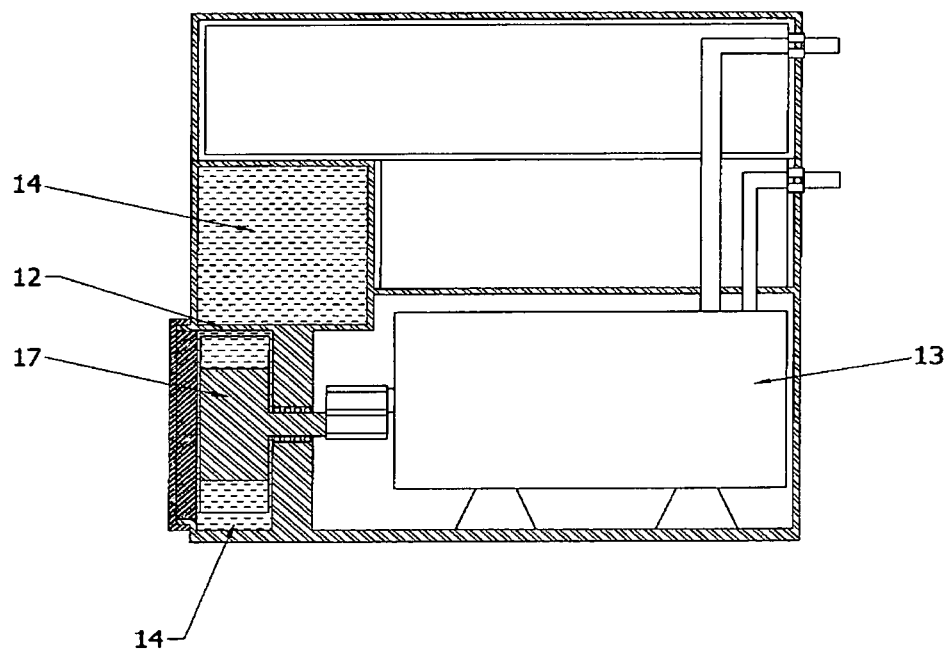
FIG. 5 is a section view of A-A structure in FIG. 4.
Figure 6:
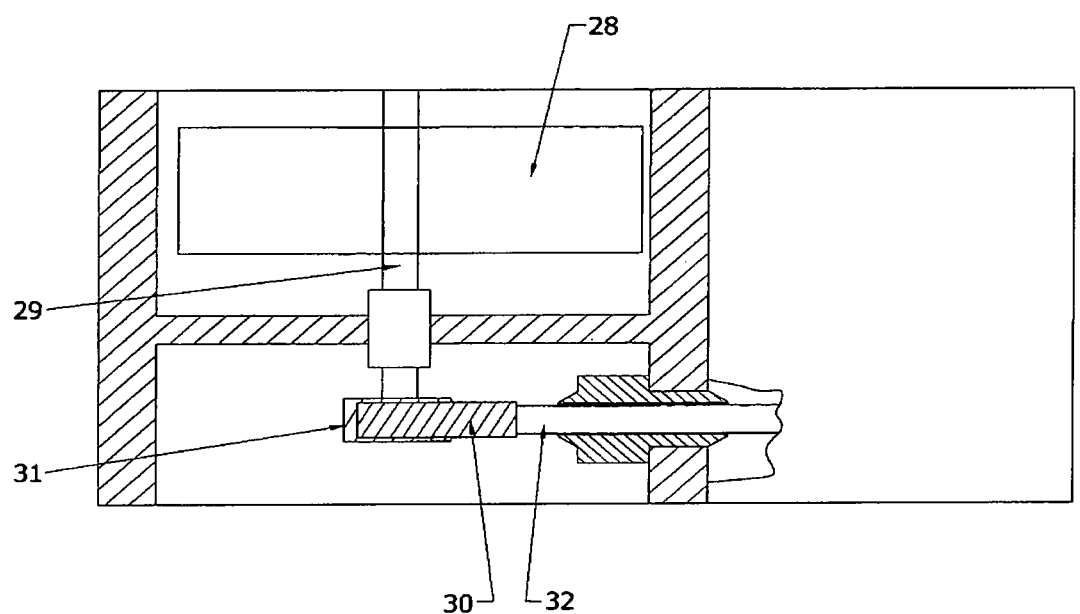
FIG. 6 is a structural representation of conduit power installation in FIG. 4.

As shown in FIGS. 4, 5 and 6. Embodiment 2 is basically identical with Embodiment 1 of the present invention, the only difference is the following structure, including a water tank 23 disposed on height, the water tank 23 is connected to the lower green plant irrigation system 24 through a main delivery pipe 25. The water tank 23 is connected to the lower water source through a delivery pipe 26. The end of delivers pipe 26 is connected to a water pump 27, The water pump 27 is powered by storage battery. The generator 15 is connected to the storage battery where the electric energy is delivered to and stored. The water tank on height and the lower green plant irrigation system are interconnected by the main delivery pipe. The electric energy generated by the generator can drive the water pump, the water pump delivers water to the water tank. As the water tank is higher than the plants, the water cars reach the plants under the effect of pressure difference. The water tank 23 can be connected to the liquid circulation chamber 14 through a delivery pipe 42. The water tank 23 can supply water to the elastic chamber 4 and liquid circulation chamber 14 through the delivery pipe 42.

As shown in FIGS. 4 and 5, a conduit power installation is disposed on the main delivery pipe 25. The conduit power installation has a casing, both ends of the casing are connected to the body of the main delivery pipe 25, a turbofan 28 is disposed in the casing, the main shaft 29 of turbofan 28 is connected to a worm wheel 31. The worm wheel 31 engages with a transversely distributed worm 30. The worm 30 is disposed on a transverse shaft 32. The worm wheel 31 drives the transverse shaft 32 to rotate. A brush connected to a closed circuit is disposed on the transverse shaft 32. The brush is located in a magnet, cutting magnetic lines during rotation to generate electricity. The conduit power installation is connected to the power grid. The conduit power installation can be driven by the water flow to generate electricity when the water in the water tank 23 is being delivered for irrigation.

As shown in FIGS. 1 and 2, the wind power installation 9 has a casing, the casing has an air inlet 33 connected to the conduit. A wind wheel 34 is disposed in the casing. The wind wheel 34 has paddles, the wind wheel 34 is rotatably fitted over the main shaft the main shaft is connected to the bearing insert. The bearing is fixed by a support in the casing. The generator is installed on die side of casing. The driving shaft 35 of generator penetrates through the casing to form a gear worm mechanism coordination with the main shaft. The wind power installation 9 can fully use the airflow discharged outwards by the piston 3 under the effect of joint upward restoration of elastic mechanism and elastic chamber 4 to generate electricity.

As shown in FIGS. 1 and 3, the elastic mechanism comprises at least four elastic pieces 36 installed between the piston 3 and the bottom wall of case. An elastic piece comprises a high strength spring 37, a spring rod 38 and a spring sleeve 39. The spring sleeve 39 is fixed to the bottom wall of case. There is a downward guide hole 40 in the spring sleeve 39. The spring rod 38 is fixed to the piston 3. The high strength spring 37 is fitted over the spring rod 38 and in the spring sleeve 39. The spring rod 38 is inserted downwards into the guide hole 40.

As shown in FIG. 1, the upper surface of elastic chamber 4 is fixed to the piston 3, the lower surface is fixed to the bottom wall of tire case. The elastic chamber 4 is opened under the effect of elastic-restoring force of piston. The permanent connection of the elastic chamber 4 with the piston 3 and case bottom helps the elastic chamber 4 open with piston 3 under the effect of elastic mechanism.

We claim:

1. A road traffic and wind energy cogeneration system, comprising an energy conversion device and a road bearing mechanism, wherein the road bearing mechanism has a container, the container includes a case and a top cover; a piston is disposed in the case; an elastic chamber is disposed between the piston and a bottom wall of the case; the elastic chamber is filled with liquid; a guide column is fixed to the piston; the guide column penetrates upwards through the top cover to be fixed to a road pressure plate; an elastic mechanism is disposed between the piston and case bottom; an air cavity is formed between the top cover and piston; the air cavity is connected to the wind power installation through a conduit; the elastic chamber is connected to a water flow power installation through the conduit;

wherein the water flow power installation includes a casing, a sealing gland and a shielding can; multiple storage batteries connected by conductors are disposed in an upper part of the casing, and a generator connected to the storage batteries by conductors are disposed in a lower part of the casing; the sealing gland is removably connected to the casing, and the space between the sealing gland and casing forms a liquid circulation chamber; the shaft of the generator extends into the liquid circulation chamber; a shielding can and an impeller connected to the shaft are disposed in the liquid circulation chamber; the shielding can covers the impeller, and a left water circulation channel and a right water circulation channel are disposed in the lower ends on both sides of shielding can; the elastic chamber is connected to the left water circulation channel by a conduit; a first one-way valve conducted to the shielding can unidirectionally is disposed at the joint of the shielding can and conduit; a second one-way valve conducted to the conduit unidirectionally is disposed at the joint of the left water circulation channel and conduit.

2. The road traffic and wind energy cogeneration system defined in claim 1, wherein the wind energy cogeneration system includes a water tank installed at a high place thereof, the water tank is connected to a lower green plant irrigation system by a main delivery pipe; the water tank is connected to the lower water source by a delivery pipe; an end of the delivery pipe is connected to a water pump; the water pump is powered by a storage battery; the generator is connected to the storage battery where the electric energy is delivered to and stored.

3. The road traffic and wind energy cogeneration system defined in claim 2, wherein a conduit power installation is disposed on the main delivery pipe; the conduit power installation has a casing, both ends of the casing are connected to the body of the main delivery pipe; a turbofan is disposed in the casing, the main shaft of turbofan is connected to a worm wheel; the worm wheel engages with a transversely distributed worm; the worm is located on the transverse shaft; the worm wheel drives the transverse shaft to rotate; a brush connected to the closed circuit is disposed on the transverse shaft; the brush is in the magnet, cutting magnetic lines during rotation to generate electricity; the conduit power installation is connected to the power grid.

4. The road traffic and wind energy cogeneration system defined in claim 1, wherein the wind power installation has a casing, the casing has an air inlet connected to the conduit; a wind wheel is disposed in the casing; the wind wheel has paddles; the wind wheel is rotatablely fitted over the main shaft; the main shaft is connected to a bearing; the bearing is fixed to the casing by a support; the generator is installed on the side of casing; the driving shaft of generator penetrates through the casing to form gear worm mechanism coordination with the main shaft.

5. The road traffic and wind energy cogeneration system defined in claim 4, wherein the elastic mechanism comprises at least four elastic pieces between the piston and the bottom wall of case; an elastic piece comprises a high strength spring, a spring rod and a spring sleeve; the spring sleeve is fixed to the bottom wall of case; the spring sleeve includes a downward guide hole; the spring rod is fixed to the piston; the high strength spring is fitted over the spring rod and in the spring sleeve; the spring rod is inserted downwards into the guide hole.

6. The road traffic and wind energy cogeneration system defined in claim 4, wherein the upper surface of elastic chamber is fixed to the piston, and the lower surface is fixed to the bottom wall of the case.

7. The road traffic and wind energy cogeneration system defined in claim 1, wherein the elastic mechanism comprises at least four elastic pieces between the piston and the bottom wall of the casing; an elastic piece comprises a high strength spring, a spring rod and a spring sleeve; the spring sleeve is fixed to the bottom wall of the casing; the spring sleeve includes a downward guide hole; the spring rod is fixed to the piston; the high strength spring is fitted over the spring rod and in the spring sleeve; the spring rod is inserted downwards into the guide hole.

8. The road traffic and wind energy cogeneration system defined in claim 7, wherein the upper surface of elastic chamber is fixed to the piston, and the lower surface is fixed to the bottom wall of the case.

9. The road traffic and wind energy cogeneration system defined in claim 1, wherein the upper surface of elastic chamber is fixed to the piston, and the lower surface is fixed to the bottom wall of the case.

\* \* \* \* \*